United States Patent
Lin et al.

(10) Patent No.: US 9,002,116 B2
(45) Date of Patent: Apr. 7, 2015

(54) ATTRIBUTE RECOGNITION VIA VISUAL SEARCH

(71) Applicant: Adobe Systems Incorporated, San Jose, CA (US)

(72) Inventors: Zhe Lin, Fremont, CA (US); Jonathan Brandt, Santa Cruz, CA (US); Xiaohui Shen, Evanston (CN)

(73) Assignee: Adobe Systems Incorporated, San Jose, CA (US)

( * ) Notice: Subject to any disclaimer, the term of this patent is extended or adjusted under 35 U.S.C. 154(b) by 104 days.

(21) Appl. No.: 13/782,181

(22) Filed: Mar. 1, 2013

(65) Prior Publication Data

US 2014/0247992 A1 Sep. 4, 2014

(51) Int. Cl.
*G06K 9/46* (2006.01)
*G06K 9/62* (2006.01)

(52) U.S. Cl.
CPC .................................... *G06K 9/6202* (2013.01)

(58) Field of Classification Search
USPC .............. 382/168, 195, 209; 707/962, 999, 6
See application file for complete search history.

(56) References Cited

U.S. PATENT DOCUMENTS

| | | | |
|---|---|---|---|
| 2006/0004278 A1* | 1/2006 | Giger et al. .................... | 600/408 |
| 2009/0324103 A1* | 12/2009 | Gelfand et al. ................ | 382/224 |
| 2010/0260438 A1* | 10/2010 | Morikawa et al. ............ | 382/284 |
| 2011/0029553 A1* | 2/2011 | Bogart et al. .................. | 707/769 |
| 2011/0137894 A1* | 6/2011 | Narayanan et al. ........... | 707/723 |
| 2012/0151413 A1* | 6/2012 | Nurmi et al. ................... | 715/825 |
| 2013/0097554 A1* | 4/2013 | Wyeld ............................ | 715/782 |
| 2013/0120656 A1* | 5/2013 | Wilson et al. ................. | 348/563 |

* cited by examiner

*Primary Examiner* — Gregory F Cunningham
(74) *Attorney, Agent, or Firm* — Kilpatrick Townsend & Stockton LLP

(57) ABSTRACT

One exemplary embodiment involves identifying feature matches between each of a plurality of object images and a test image, each feature matches between a feature of a respective object image and a matching feature of the test image, wherein there is a spatial relationship between each respective object image feature and a test image feature, and wherein the object depicted in the test image comprises a plurality of attributes. Additionally, the embodiment involves estimating, for each attribute in the test image, an attribute value based at least in part on information stored in a metadata associated with each of the object images.

20 Claims, 10 Drawing Sheets

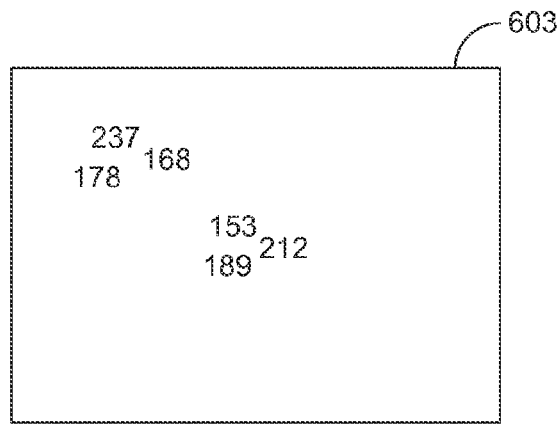
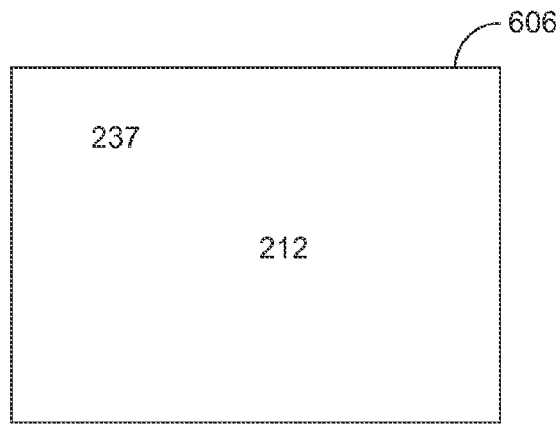
FIG. 7

ATTRIBUTE RECOGNITION VIA VISUAL SEARCH

FIELD

This disclosure relates generally to computer software and more particularly relates to the creation, modification, use, and distribution of images and similar electronic content.

BACKGROUND

Many conventional approaches to detecting objects in images are based on a sliding window approach. For example, if the object to be detected is a face of an individual, the sliding window approach calls for sliding a rectangle across the image and collecting "face likelihood" information to implement face detection. One of various conventional techniques may be applied to implement the object detection, such as, for example, the Viola-Jones detection framework using the Haar-wavelet technique. These conventional techniques involve training a binary classifier from an image database that consists of both objects and non-objects and then sliding a rectangle across each image in the database to perform the detection and in some instances, varying the scale of the images based on the test image to be detected. Each subimage corresponding to the sliding rectangle is examined by the binary classifier to determine if it is an instance of the object category, e.g., a face.

However, existing use of the sliding window approach can provide poor results in certain circumstances. For example, for face detection, a test image may be a profile view of a face, a slanted view of a face, and/or may otherwise depict an occluded view of a face. The sliding window approach is limited with respect to detecting these types of faces because of the difficulty of learning a good classifier encoding all possible variations. Additionally, the sliding window approach can provide poor or no results for recognizing certain attributes on the test image.

SUMMARY

Disclosed are embodiments for recognizing attributes of a test image based on the object images used to detect the location of the object in the test image. Disclosed are embodiments for receiving, at a computing device comprising a processor, a test image and a plurality of object images detected to depict an object similar to the test image, the object comprising a plurality of attributes and identifying a plurality of attribute values of the object depicted in the object images, the attribute values stored in a metadata associated with each object image. Additionally, disclosed are embodiments for estimating, for each attribute, a corresponding attribute value of the object depicted in the test image based on the attribute values stored in the metadata associated with the object images.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where:

FIG. 7 is an illustration of selecting maximum modes and implementing non-maxima suppression;

DETAILED DESCRIPTION

Figure 1:
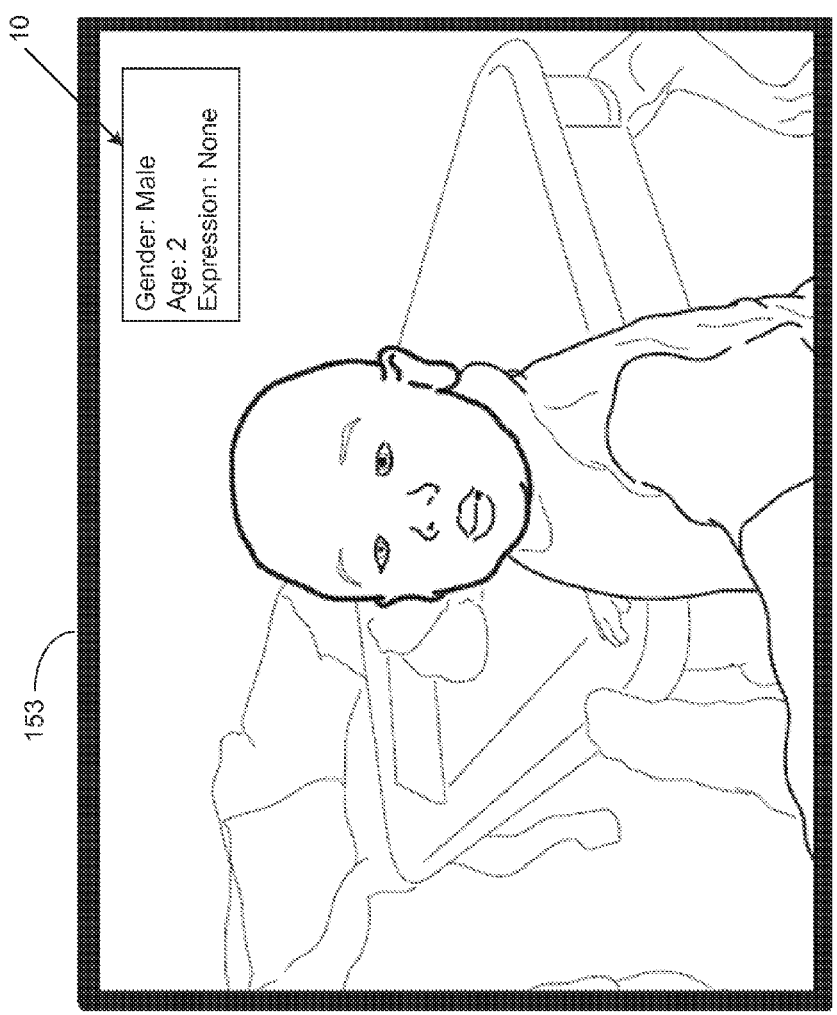
FIG. 1 illustrates validation of a candidate sub-rectangle of a test image with a known location of an object in an object image.

Methods and systems are disclosed for estimating attributes of an object depicted in a test image based on a set of object images detected to depict a similar object as the test image. For example, referring to FIG. 1, the object depicted in the test image 153 may be a face and attributes may include an age of the individual in the test image, a gender of the individual, an expression of the individual, and/or other attributes exhibited by the individual depicted in the test image. In one embodiment, the object images detected to depict a similar object as the test image 153 each include metadata that describe the attributes of the individual depicted in the respective object image. The attributes of the object depicted in the test image may be estimated from the metadata of the set of object images detected to depict a similar object as the test image and an attribute block 10 may be rendered on a display that includes the estimated attributes.

For instance, the age of the individual in the test image 153 may be an average of the ages annotated in the metadata of the object images, the gender of the individual may be transferred from the metadata of the object images, and the expression may be an average of the expressions annotated in the metadata of the object images. Other attributes may also be transferred from the metadata of the object images such as a hair color, a hair style, whether the individual wears glasses, existence of any birth marks and descriptions thereof, and/or other properties. Additionally, a pose of the individual may also be estimated from the metadata of the object images. For example, the directional view of the individual's face may be stored in the metadata (i.e., left side, right side, looking up and/or looking down) which may then be transferred to the test image to estimate the pose of the individual in the test image.

In one embodiment, the attributes of the test image 153 may be estimated using a set of top ranked detected object images 159. The top ranked, e.g., the object images with the faces that are the most similar to the face of the test image, may be selected in various ways. The object images 159 in the set of top ranked detected object images may be determined based on a set of similarity scores between the respective object image and the test image and similarity voting maps, as will be discussed. Metadata of the object in each of the object images 159 in the set of top ranked detected object images can be received based on prior input or determinations, or based on current input. The values of the metadata may be identified manually or automatically. For example, the age and gender of the individual in the object image may be manually indicated in a process known as ground-truthing. Each object image may be associated with a repository that has been ground-truthed to indicate the attributes of the faces in the object images. The attributes are then stored in the metadata associated with the object image. These attributes, such as age, gender, and expression, may then be determined from the metadata of the objects images 159 in the set of top ranked detected object images to estimate the attributes of the object in the test image 153. The estimated attributes 10 of the object in the test image 153 may then be rendered on a display.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 2:
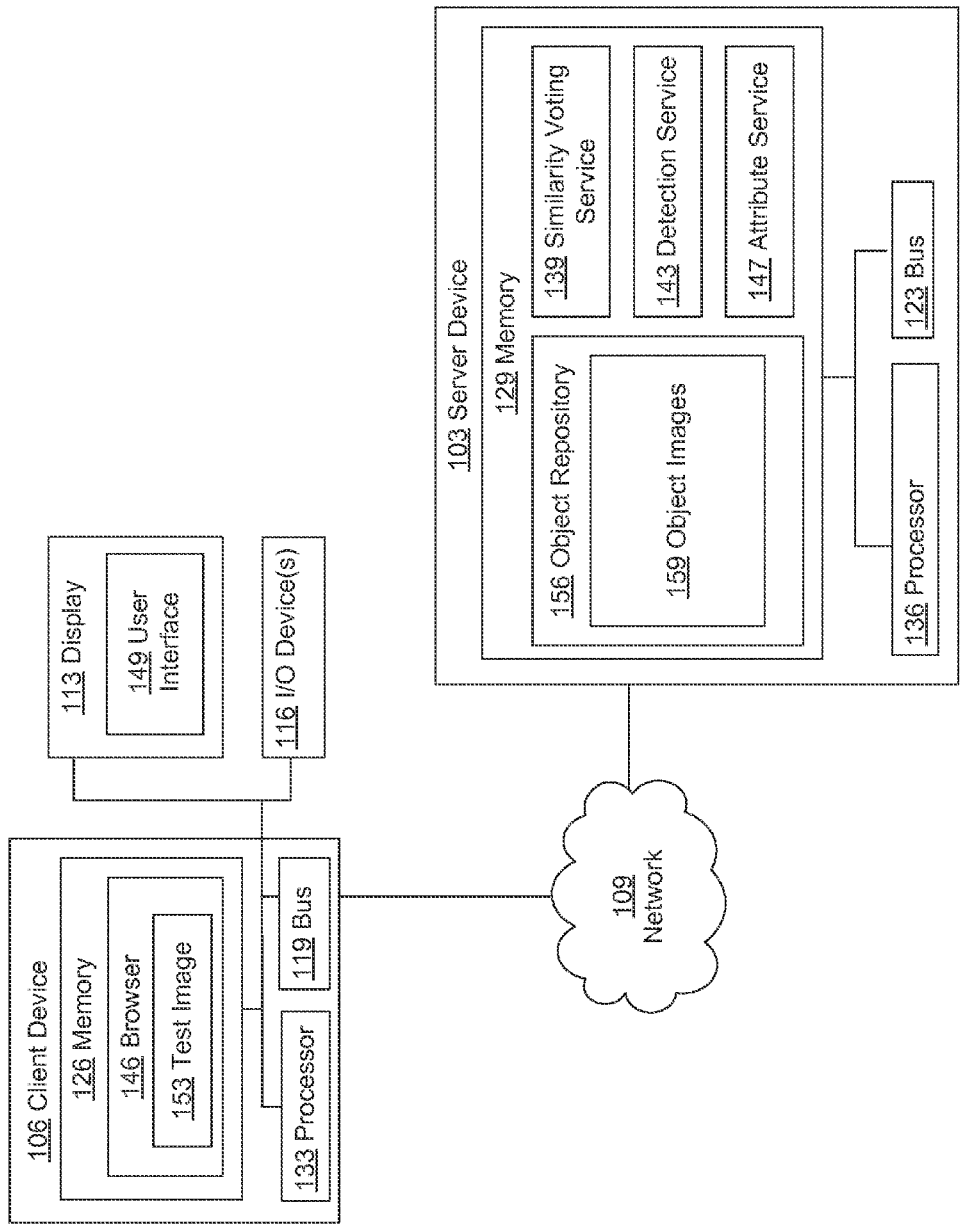
FIG. 2 is a block diagram depicting exemplary computing devices in an exemplary computing environment for implementing certain embodiments.

FIG. 2 depicts an exemplary computing environment for detecting objects depicted in a test image and recognizing attributes of the objects depicted in the test image. The methods and systems disclosed herein are also applicable on other computing systems and environments. The environment shown in FIG. 2 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include a similarity voting service 139, a detection service 143, and an attribute service 147.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 2, client device 106 includes a memory 126 that includes a browser 146. In one embodiment, the browser 146 may be a browser that renders a user interface 149 on the display 113 associated with the client device 106. The browser 146 may be executed to transmit a request to the server device 103 for detecting objects depicted in a test image 153. For example, a user on the client device 106 may request to detect one or objects depicted in a test image 153 by manipulating the user interface 149 rendered on the display 113. The browser 146 may then transmit the request to the detection service 143 and in response, receive an indication of the detected object. In one embodiment, upon receiving the indication of the detected object, the browser 146 may render the indication of the detected object on the display 113.

The server device 103 includes a memory 129 that includes the similarity voting service 139, the detection service 143, the attribute service 147, an object repository 156, and/or other components. The object repository 156 includes a collection of object images 159. For example, the object images 159 may depict faces of individuals and the test image 153 may depict a face of one more of individuals. The detection service 143 receives the test image 153 and invokes the similarity voting service 139 to generate a similarity voting map for the test image 153 based on each object image 159 included in the object repository 156. The detection service 143 determines a set of object images 159 that detect an object similar to the test image 153 based on the similarity voting maps, as will be discussed. In one embodiment, the detection service 143 receives the similarity voting maps generated by the similarity voting service 139 and modifies each of the similarity voting maps to attempt to eliminate false positive results. For example, this may involve gating each similarity voting map using a similarity threshold. The gated maps are aggregated to provide an aggregate similarity voting map.

Having generated the aggregate similarity voting map, the detection service 144 then can apply a technique to identify the most representative score or scores within an aggregate similarity voting map. For example, an aggregate map may have a similarity score of 10 that is in a neighborhood surrounded by other nearby high scores in the same neighborhood that all reflect a similarity of a face to the corresponding portions of the test image represented by those scores. High scores in portions of the test image that are further away (i.e. outside of the neighborhood) may correspond to a different face but high scores that are near one another (i.e. within the neighborhood) can be treated as corresponding to a single object. Accordingly, a technique can be applied to select the best score or scores. In one embodiment, this involves the use of a maximum mode and non-maxima suppression of the aggregate similarity voting map. The resulting aggregated similarity voting map then reflects the location of the object in the test image. For example, a sub-rectangle can be determined from the similarity voting map where the highest similarity represents a center of the sub-rectangle of the test image thereby localizing the object in the test image.

The attribute service 147 estimates attributes of the object depicted in the test image 153 based on the attributes indicated in the metadata of the object images 159. For example, a ground-truthing process may be applied where the attributes of the faces in the object images 159 are manually indicated in the metadata of the respective object image. The attribute service 147 receives a set of object images 159 and estimates the attributes of the test image 153 based on the attributes indicated in the metadata of the detected object images 159. In one embodiment, the attribute service 147 may receive a set of object images 159 that have been previously detected to depict an object similar to the test image 153. Additionally, the set of object images 159 may be a number of top ranked images of the detected object images 159. For example, the top ranked detected object images 159 may be determined based on their respective similarity scores with respect to the test image 153. The detected object images 159 having the higher similarity scores may be the object images 159 included in the set of top ranked images. The attribute service 147 identifies the property value for each attribute in the metadata of each object image 159 and estimates the value of the attribute in the test image 153 based on the metadata values. For example, the attribute service 147 may average the ages stored in the metadata of each object image 159 to estimate the age of the individual depicted in the test image 153.

In one embodiment, a user on the client device 106 transmits the request to detect the object depicted in the test image 153 by manipulating one or more user interfaces 149 rendered on the display 113 via one or more I/O devices 116, such as a keyboard and/or a mouse. The detection service 143 receives the request and invokes the similarity voting service 139 to generate a similarity voting map of the test image 153 based on each one of the object images 159 in the object repository 156, as described in U.S. patent application Ser. No. 13/552,595 entitled "Image Retrieval with Spatially-Constrained Similarity Measure and k-NN re-ranking" filed on Jul. 18, 2012 and U.S. patent application Ser. No. 13/624,615 entitled "A Technique to Mobile Product Image Search by Automatic Query Object Localization and Segmentation Application" filed on Sep. 21, 2012 which are hereby incorporated by reference in its entirety.

To this end, the similarity voting service 139 evaluates a similarity between the test image 153 and each one of the object images 159 in the object repository 156. A sub-rectangle indicating a location of the object in the object image 159 may have been previously identified. The similarity voting service 139 evaluates the content of the sub-rectangle with the object depicted in the test image 153, such as the features within the sub-rectangle. For instance, spatial information of each object image 159 may be represented by a sub-rectangle $B=\{x_c, y_c, w, h, \theta\}$ where $(x_c, y_c)$ is the coordinate of the rectangle center, w and h are the width and height of the rectangle respectively, and e is the rotated angle of the rectangle. The similarity voting service 139 determines whether the test image 159 has similar features as the features of the sub-rectangle in the object image 159. For example, the sub-rectangle in the test image 153 may be represented as $B'=\{x_c+x_t, y_c+y_t, s \cdot w, s \cdot h, \theta=\alpha\}$. The similarity voting service 139 determines the sub-rectangle in the test image 153 based on each object image 159 and generates a voting similarity map based on the similarity of features between the sub-rectangle of the test image 153 and the sub-rectangle of each object image 159. For example, the similarity may be represented by a numerical floating value such as 0.5, 10.8, 100.4 and the like. In one embodiment, the similarity voting service 139 may calculate the relative locations of features within the object image 159 with respect to the center and compare the calculated locations with the corresponding locations within the test image 153 to determine if the feature at the corresponding location in the test image 153 matches the feature of the object image 159. In one embodiment, the similarity voting service 139 may also determine which object images 159 are associated with the highest similarity scores. These object images 159 may be the top-ranked object images 159 detected to depict a similar object as the test image 153.

Next, the similarity voting service 139 generates a similarity voting map between the test image 153 and each object image 159. For example, the similarity voting service 139 identifies a matching feature between the test image 153 and the object image 159 and determines a location of a rectangle center. The similarity voting service 139 then maps a voting score for the determined location. For instance, if the matching feature pairs are spatially consistent, then the corresponding center locations should be similar. The similarity voting service 139 generates a voting score for a complete set of matching pairs of elements between the test image 153 and the object image 159 and generates a voting map based on the cumulative voting scores of all of the matched features.

The detection service 143 then determines which ones of the similarity voting scores generated by the similarity voting service 139 is within a similarity threshold. To this end, the detection service 143 implements a "gating" approach to determine which portions of the similarity voting maps are within the similarity threshold for each object image 159. For example, the detection service 143 subtracts the similarity threshold from each similarity voting map and sets any negative values to zero. Each object image 159 in the object repository 156 may be associated with a similarity threshold. For instance, the similarity threshold may be based at least in part on an empirical estimation that an object depicted in the test image 153 is similar to the object depicted in the object image 159. In one embodiment, the similarity threshold represents the maximum similarity score between the object image 159 and any possible portion (for example, a non-face portion) of any test image 153 which can be determined based on past results through a training process. In the case of face detection, subtracting the similarity threshold from the similarity voting maps reduces the chances of non-face portions of the test image 153 being positively detected as faces. The detection service 143 implements the gating by subtracting the similarity threshold value from each similarity voting map thereby reducing all of the similarity scores represented by the similarity voting map. Any negative scores are replaced with a zero as the negative scores correspond with non-face portions of the test image 153 that would yield a false positive. The remaining similarity scores in the similarity voting map may then be used in the aggregation, as will be described.

Each object image 159 is associated with a similarity threshold. In one embodiment, the similarity threshold may be discriminatively learned. For example, a collection of negative training sets may be collected defined as N. Each object image 159 in the object repository 156 is defined as $c_i$ and the similarity threshold for the respective object image 153 is defined as $t_i$. The similarity threshold for each object image 159 can be defined as:

$$t_i = \max_{j \in N} s_i(x_j)$$

where $s_i(x)$ is the similarity score between the object image 159 and a test image 153 and N represents a negative training set.

The detection service 143 then aggregates all of the similarity voting maps after similarity voting maps have been gated using the similarity threshold. In one embodiment, the aggregation is defined as follows:

$$S(x) = \sum_{i : s_i(x) > t_i} (s_i(x) - t_i)$$

where S(x) is the final similarity score for the test image 153, $s_i(x)$ is the similarity score between the test image 153 and the object image 159, and t is the corresponding similarity threshold. The aggregation of the similarity voting maps is implemented after the gating to remove any similarity voting maps of object images 159 that are unlikely to depict the object in the test image 153. Thus, the similarity voting maps that are associated with a similarity score that is less than the similarity threshold are treated as providing no information about the object depicted in the test image 153 and are therefore regarded as "zero." Excluding similarity voting maps associated with a similarity score that is less than the similarity threshold in the aggregation of the similarity voting maps will result in a higher confidence in the aggregation. After aggregating the similarity voting maps that are within the similarity threshold, the detection service 143 then selects the maximum nodes from the maps with non-maxima suppression to get the final detection results. For example, the high similarity portion of the aggregated similarity voting map may be the center of the sub-rectangle that defines the bounds of the object in the test image 153.

Next, the attribute service 147 estimates the attributes of the object depicted in the test image 153 based on the metadata associated with the detected object images 159. In one embodiment, the attribute service 147 transfers the attributes in the metadata of the object images 159 to the test image 153. The attribute service 147 identifies an attribute A in the metadata of the object images 159 which has m property values $(a_1, a_2, \ldots a_m)$. For example, the gender attribute has two properties: male and female, while the expression attribute may have several properties, such as happy, sad, surprise, neutral, and etc. The property values for the attributes of the object images 159 may be manually indicated via ground-truthing and stored in the metadata of the respective object images 159.

The attribute service 147 identifies the property values for the attribute A in each of the object images 159 in the set of object images detected to depict a similar object as the test image 153 and averages the values. For instance, if the attribute A is an age of the individual, then the attribute service 147 estimates the age of the individual in the test image 153 to be an average of all of the ages in the metadata of the respective object images 159. If the attribute A is a hair color of the individual, then the attribute service 147 estimates the hair color of the individual in the test image 153 to be a mode of all of the hair colors in the metadata of the respective object images 159. Similarly, the attribute service 147 may also estimate other attributes A such as eye color, gender, expression, etc. by determining the mode of the respective values of A in the metadata associated with the object images 159.

In another embodiment, the attribute service 147 may estimate the attributes A of the object in the test image 153 by computing a likely value of each attribute A based on the distribution of the property values for the respective attribute A in the set of object images 159. To this end, the attribute service 147 first determines the distribution of the property values for A across the set of object images 159 detected to depict a similar object as the test image 153. In another embodiment, the attribute service 147 may determine the distribution of the property values for A across all of the object images 159 in the object repository 156. For example, the distribution of attribute A over the entire object repository 156 may be expressed as:

$$\{P(a_1), P(a_2), \ldots, P(a_m)\} (\Sigma_{i=1}^m P(a_i) = 1).$$

Next, the attribute service 147 computes a histogram of the attribute A using the property values $(a_1, a_2, \ldots a_m)$ found in the metadata of each object image 159 in the set of object images. For example, the histogram of the property values in the set of object images may be expressed as:

$$\{H(a_1), H(a_2), \ldots, H(a_m)\} (\Sigma_{i=1}^m H(a_i) = 1)$$

In one embodiment, the histogram of the attribute distribution may be calculated by counting the number of object images 159 in the set of object images that have a certain attribute. The histogram for the attribute is then based on the total number normalized by the total number of object images 159 in the set of object images. In one embodiment, the computed histogram may represt the posterior distribution of the attribute A across the set of object images 159 that have been detected to depict a similar object as the test image 153. Next, the attribute service 147 determines the value of the respective attribute A for the object depicted in the test image 153 by computing the maximum likelihood based on the distribution of the attribute A and the histogram of the property values of the attribute A, expressed as:

$$\bar{t} = \arg\max_t \frac{H(a_t)}{P(a_t)}$$

In one embodiment, the estimated attribute values for each attribute A may be rendered on the display 113. For example, the attribute service 147 may render property values for attributes such as age, gender, eye color, hair color, whether the individual wears glasses, a pose, and/or any other attribute associated with the object and stored in the metadata of the object images 159.

Figure 3:
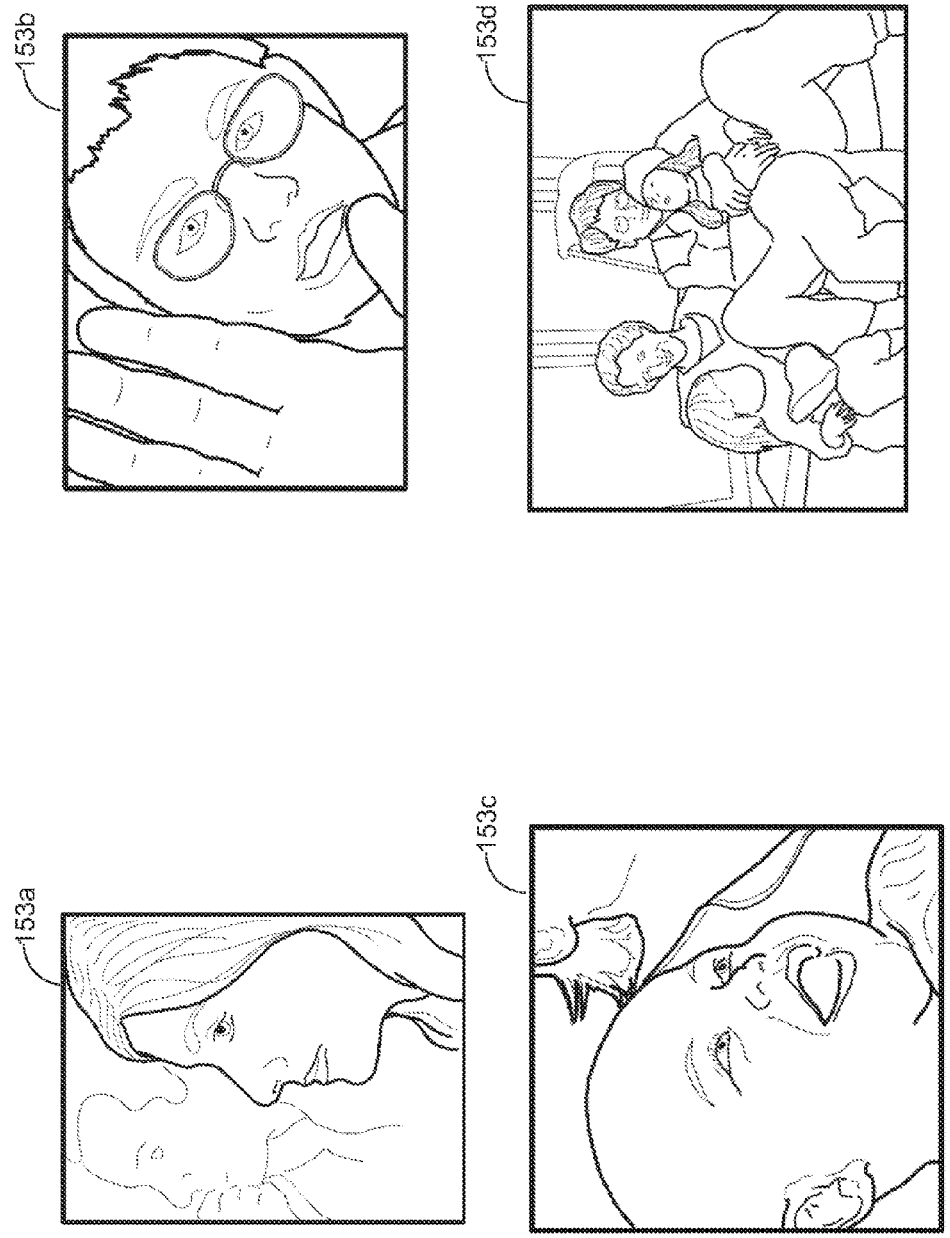
FIG. 3 is an illustration of images for detecting objects depicted in the images that may result in poor results using the sliding window approach.

FIG. 3 depicts a plurality of test images 153 with challenging views. For example, test image 153a depicts a face with a profile view that only shows a portion of the characteristics of a face. Test image 153b depicts a face partially occluded that skews the view of the characteristics of a face. For instance, a hand casts a shadow across the face, blocks a portion of the face and alters the overall focus of the image to create a challenging image for detection. Test image 153c depicts a large face with an angled view that shows only a portion of the characteristics of the face and test image 153d shows multiple faces at varying angles where some of the faces are partially occluded. The test images 153 represent challenging views for image detection using conventional approaches such as the sliding window approach.

Figure 4:
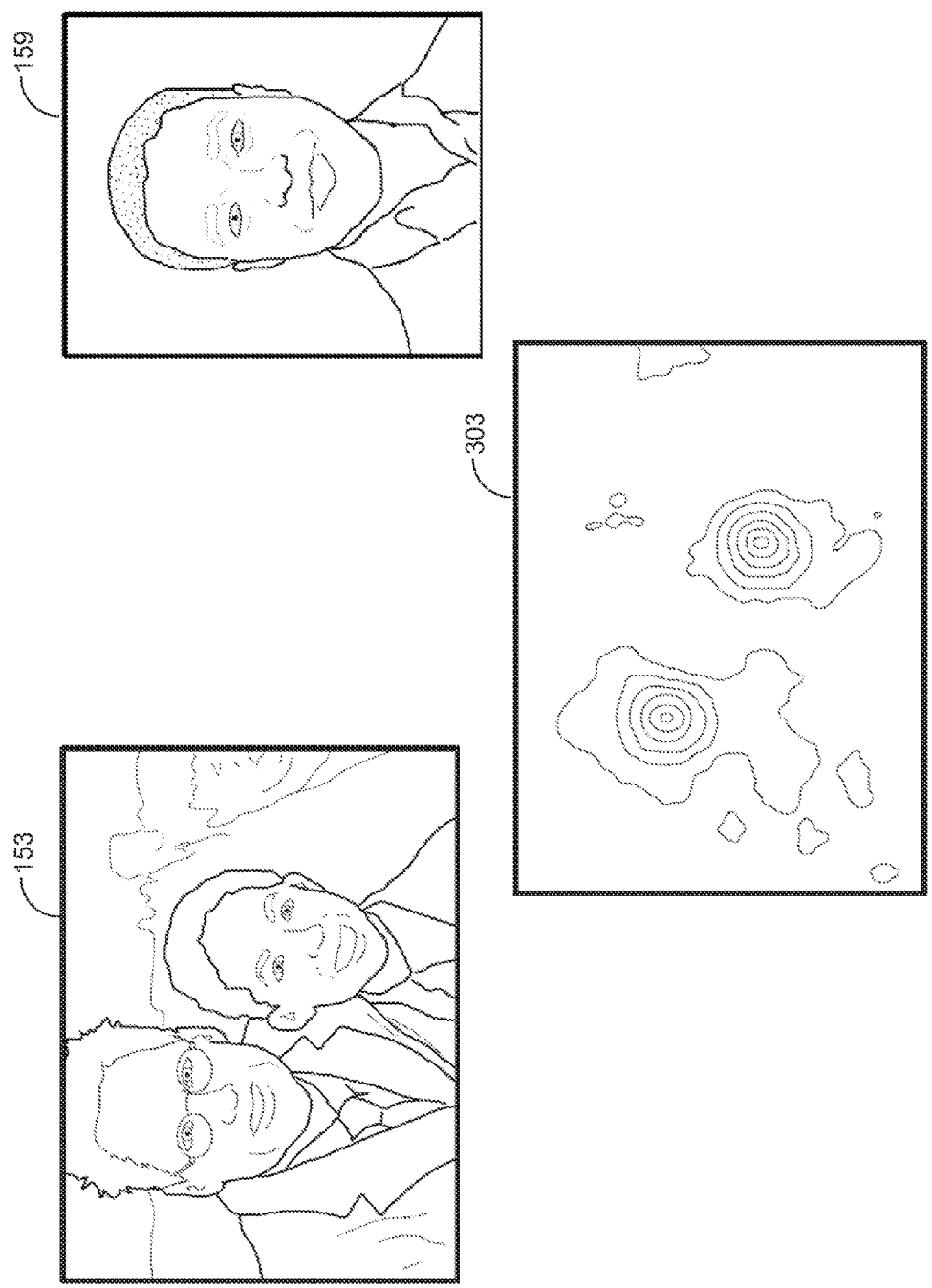
FIG. 4 is an illustration of a similarity voting map defining the similarity between a test image and an exemplar image.

FIG. 4 depicts a test image 153, an object image 159 and a similarity voting map 303. In one embodiment, a user on the client device 106 may provide the test image 153 for image detection by manipulating a user interface 149 (FIG. 2) using one or more I/O device 116 (FIG. 2) associated with the client device 106. In this example, the test image 153 includes a plurality of faces for detection and includes two faces. In one embodiment, the detection service 143 (FIG. 2) receives the request to detect the objects (i.e., faces) in the test image 153 and invokes the similarity voting service 139 (FIG. 2) to generate a plurality of similarity voting map 303 for the test image 153 based on each of the object images 159 (FIG. 2) of the object repository 156 (FIG. 2). In this example, the object image 159 represents an exemplar image from the object repository 156 and the similarity voting map 303 represents the similarity between the test image 153 and the object image 159.

The similarity voting service 139 generates the similarity voting map 303 based on a similarity score between a sub-rectangle in the test image 153 and a sub-rectangle in the object image 159. In one embodiment, the similarity score may be defined as follows:

$$S(x, c_i) = \sum_{k=1}^{N} \sum_{\substack{(f_i, g_j) \\ f_i \in x, g_j \in c_i \\ w(f_i) = w(g_j) = k \\ \|T(L(f_s)) - L(g_j)\| < \varepsilon}} \frac{idf^2(k)}{tf_x(k) \cdot tf_{c_i}(k)}$$

where x is the test sample (i.e., a sub-rectangle in the test image 153), and $c_i$ is the i-th object image 159 in the object repository 156. $f_i$ are the local features extracted from the test sample x, and $g_j$ are the local features extracted from the ci object image 159. k denotes the k-th visual word in a learned vocabulary. For instance, a visual word corresponds to a cluster of extracted features of an image and the vocabulary corresponds to all of the clusters of the image. idf(k) is the inverse document frequency of k, $tf_x(k)$ and $tf_{ci}(k)$ are the term frequencies (i.e., number of occurrences) of k in x and $c_i$ respectively. $L(f)=(x_f, y_f)$ is the 2D image location of f. The spatial constraint $\|T(L(f_i))-L(g_j)\|<\varepsilon$ means that the locations of the two matched features should be sufficiently close under certain transformations. In one embodiment, this similarity score may be calculated on multiple scales.

The similarity voting service 139 generates the similarity voting map 303 based on the similarity scores for matching features between portions of the test image 153 and the sub-rectangle of the object image 159 as described above. In FIG. 3, the matching features of the faces in the test image 153 and the object image 159 are determined for a sub-rectangle and mapped, where the portions of the similarity voting map at the center of the concentric shapes indicates a high similarity score and the portions of the similarity voting map on the outside of the concentric shapes indicates a low similarity score. In this example, the portion of the test image 153 involving the young boy ranked higher in similarity score than the portion of the test image 153 involving the older man. Therefore, the portion of the similarity voting map involving the young boy depicts a larger portion of the map in the center of the concentric shapes than the portion of the map in the center of the concentric shapes involving the older man in the test image 153.

Figure 5:
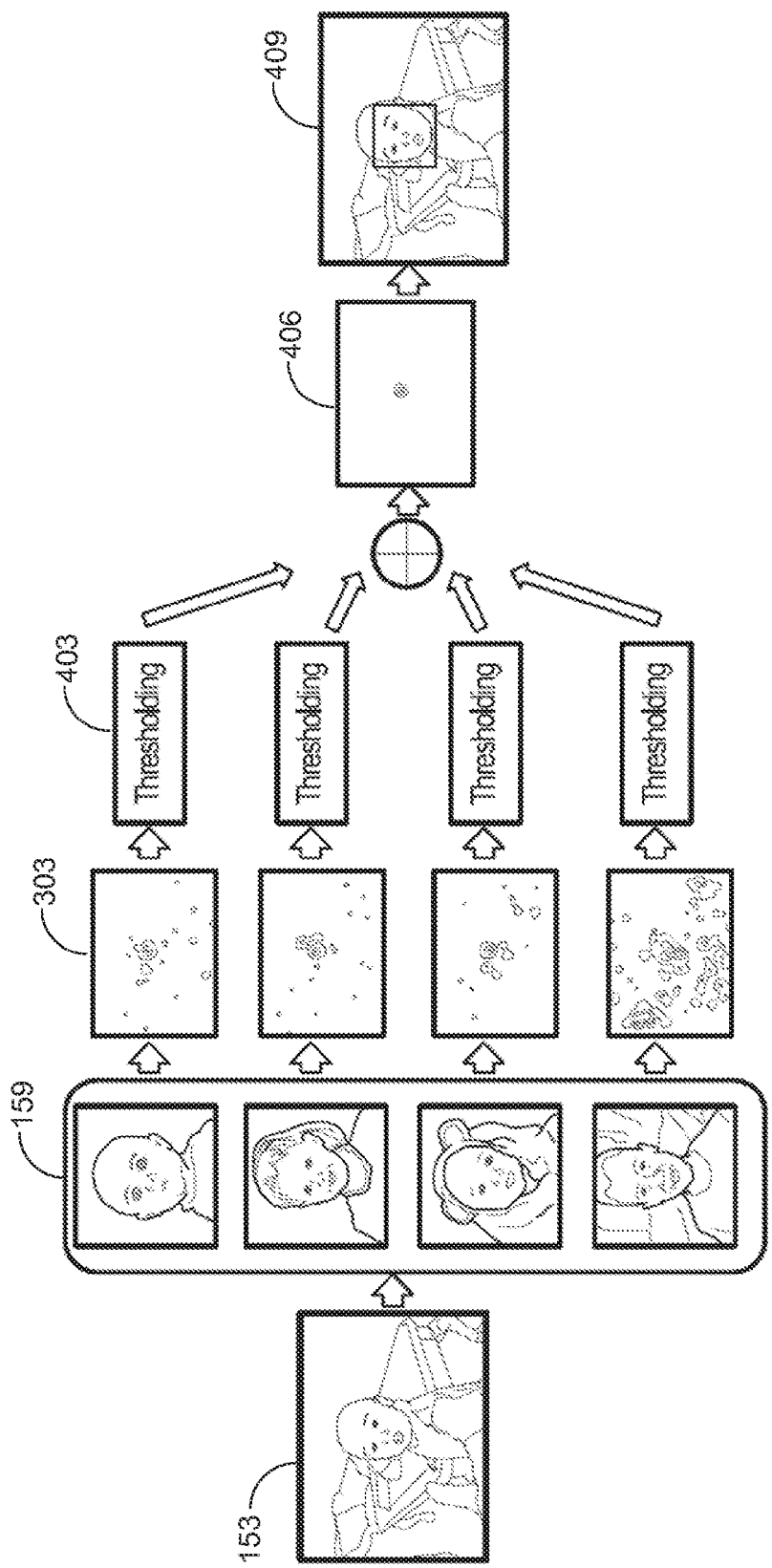
FIG. 5 is an illustration of a pipeline for detecting an object depicted in a test image based on similarity voting maps.

FIG. 5 illustrates a pipeline for image detection using the embodiments described herein. Included in FIG. 5 is an example of a test image 153, a set of object images 159 from the object repository 156 (FIG. 2), a set of similarity voting maps 303 depicting the similarity scores on a voting map between the test image 153 and the respective object image 159, thresholding 403, an aggregate similarity voting map 406, and a detected image 409. As discussed above, the detection service 143 receives the test image 153 to detect the object (i.e., face) depicted in the test image 153. In response, the detection service 143 invokes the similarity voting service 139 to generate the similarity voting maps 303 for each one of the object images 159 of the object repository 156 based on the test image 153. For example, the similarity voting service 139 generates a similarity voting map 303 between the test image 153 and each object image 159 by scoring the similarity of matching features between portions of the test image 153 and a sub-rectangle of the object image 159, as discussed above. Therefore, the similarity voting service 139 generates a similarity voting map 303 for each object image 159 in the object repository 156.

Next, the detection service 143 implements thresholding to determine whether each of the similarity voting maps 303 is within a similarity threshold. In one embodiment, the detection service 143 determines whether a similarity voting map 303 is associated with a similarity score that is within a similarity threshold for the corresponding object image 159. Upon determining which similarity voting maps 303 are equal to or greater than the similarity threshold, the detection service 143 aggregates the similarity voting maps 303 that are equal to or greater than the similarity threshold to generate an aggregate similarity voting map 406. In one embodiment, aggregating the similarity voting maps 406 may be defined as follows:

$$S(x) = \sum_{i: s_i(x) > t_i} (s_i(x) - t_i)$$

where S(x) is the final similarity detection score of x which is the test image 153, $s_i(x)$ is the similarity score between the test image 153 x and the object image 159 $c_i$, and $t_i$ is the corresponding similarity threshold. Upon generating the aggregated voting map 406, the detection service 143 selects the detected image 409 by selecting the maximum modes from the aggregated voting map 406 with non-maxima suppression.

Figure 6:
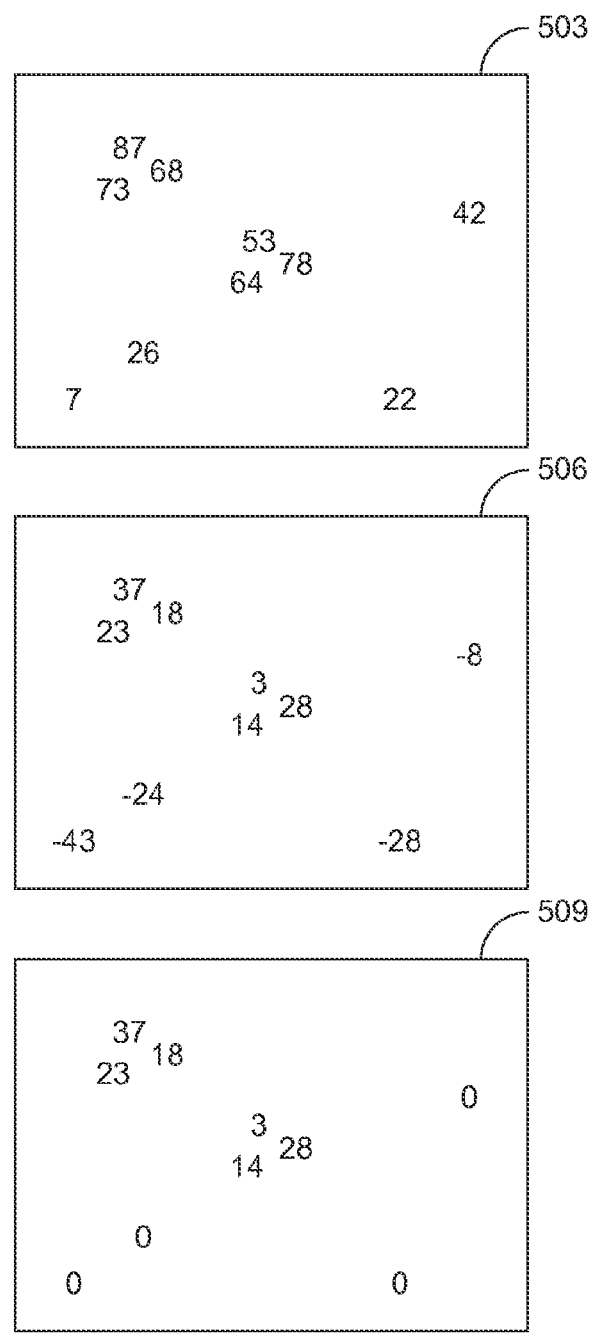
FIG. 6 is an illustration of gating a similarity voting map based on a similarity threshold associated with the object image used to generate the similarity

FIG. 6 is an illustration of gating implemented on the similarity voting maps using a similarity threshold. The similarity voting map depicts a similarity between one of the object images and a test image. As shown in FIG. 6, three similarity voting maps 503, 506 and 509 are depicted. A similarity voting map is comprised of one or more similarity scores that are generated as discussed above. For example, the similarity voting service 139 (FIG. 2) generates a similarity scores at different locations. In this embodiment, the similarity scores are represented as numerical values in map 503.

To implement gating, the detection service 143 identifies the similarity threshold for the object image used to generate the similarity voting map 503 and subtracts the similarity scores represented in the similarity voting map 503 with the similarity threshold. For example, the similarity threshold for an object image may be 50. The detection service 143 subtracts each one of the similarity scores by 50 as shown in map 506. In one embodiment, the similarity threshold represents the maximum value of a false positive result using that object image in the past. Any similarity scores below the similarity threshold are likely to be non-object portions of the test image 153 and thus can be disregarded for purposes of object detection.

Subtracting the similarity threshold from the similarity scores may produce negative similarity scores. If the similarity score is not high enough, then the resulting value after the subtraction will be a negative value. The negative similarity scores can be considered to not provide useful information about the possible location of the object in the test image and thus may be disregarded. As such, in the gating process, such negative scores can be zeroed as shown in map 509 so that these values do not adversely affect the aggregation step.

FIG. 7 is an illustration of selecting maximum modes and implementing non-maxima suppression. Shown in FIG. 7 are two similarity voting maps 603 and 606. In one embodiment, map 603 represents an aggregated similarity voting map where the detection service 143 (FIG. 2) has implemented gating on each similarity voting map generated by the similarity voting service 139 (FIG. 2) and aggregated all the gated similarity voting maps. Map 603 includes two neighborhoods of similarity scores that have been aggregated from all of the similarity voting maps generated by the similarity voting service 139. In one embodiment, each neighborhood may correspond to one object depicted in the test image 153. For example, the test image 153 may depict two faces as shown in FIG. 3.

The detection service 143 selects maximum modes in each neighborhood and implements non-maxima suppression of the other nodes in the neighborhood to determine the center of the object depicted in the test image. For example, the first neighborhood of similarity scores may correspond to features of a first object depicted in the test image 153 and the second neighborhood of similarity scores may correspond to features of a second object depicted in the test image 153. The detection service 143 identifies the maximum similarity score in each neighborhood and suppresses the non-local maxima in the neighborhood. Thus, as shown in map 606, the remaining scores are 237 of the first neighborhood and 212 of the second neighborhood. The remaining maximum modes of the neighborhoods each represent the estimated center of an object depicted in the test image 153.

Figure 8:
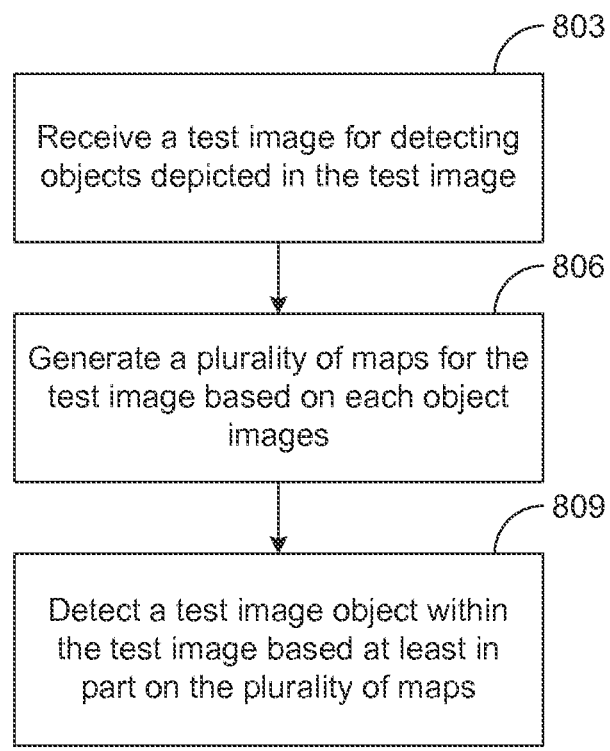
FIG. 8 is a flow chart illustrating an exemplary method of detecting an object depicted in a test image based on similarity voting maps and similarity thresholds.

FIG. 8 is a flowchart that provides one example of the operation of a portion of the detection service 143 (FIG. 2) according to certain embodiments. It is understood that the flowchart of FIG. 8 provides merely an example of the many different types of functional arrangements that may be employed to implement the operation of the portion of the detection service 143 as described herein. As an alternative, the flowchart of FIG. 8 may be viewed as depicting an example of steps of a method implemented in the computing device 103 (FIG. 2) according to one or more embodiments.

Beginning at step 803, the detection service 143 receives a test image 153 for detecting one or more objects depicted in the test image. For example, a user on a client device 106 (FIG. 2) may provide the test image 153 for detection via a user interface 149 (FIG. 2). In step 806, the detection service 143 invokes the similarity voting service 139 to generate a plurality of maps depicting the similarity between the test image 153 and each one of a plurality of object images 159. In one embodiment, the similarity voting service 139 generates the maps based at least in part on similarity scores determined from matching features between the test image 153 and the object image 159.

Then, in step 809, the detection service 143 detects a test image object within the test image 153 based at least in part on the plurality of maps. In one embodiment, the detection service 143 gates each one of the maps based on the similarity threshold associated with the corresponding object image 159 used to generate the map. To this end, the detection service 143 subtracts the similarity threshold from the similarity scores represented in each map and zeros any resulting negative values to generate a gated map. The detection service 143 then aggregates the gated maps to generate an aggregate map. For example, the detection service 143 adds all of the similarity scores from the gated maps to generate the aggregate map. Having aggregated the gated maps, the detection service 143 then selects the maximum modes in a neighborhood of similarity scores and suppresses the non-maxima nodes of the neighborhood. The resulting aggregated map indicates the location of the objects depicted in the test image 153. For instance, the maximum modes represent the center of one of the objects depicted in the test image 153.

Figure 9:
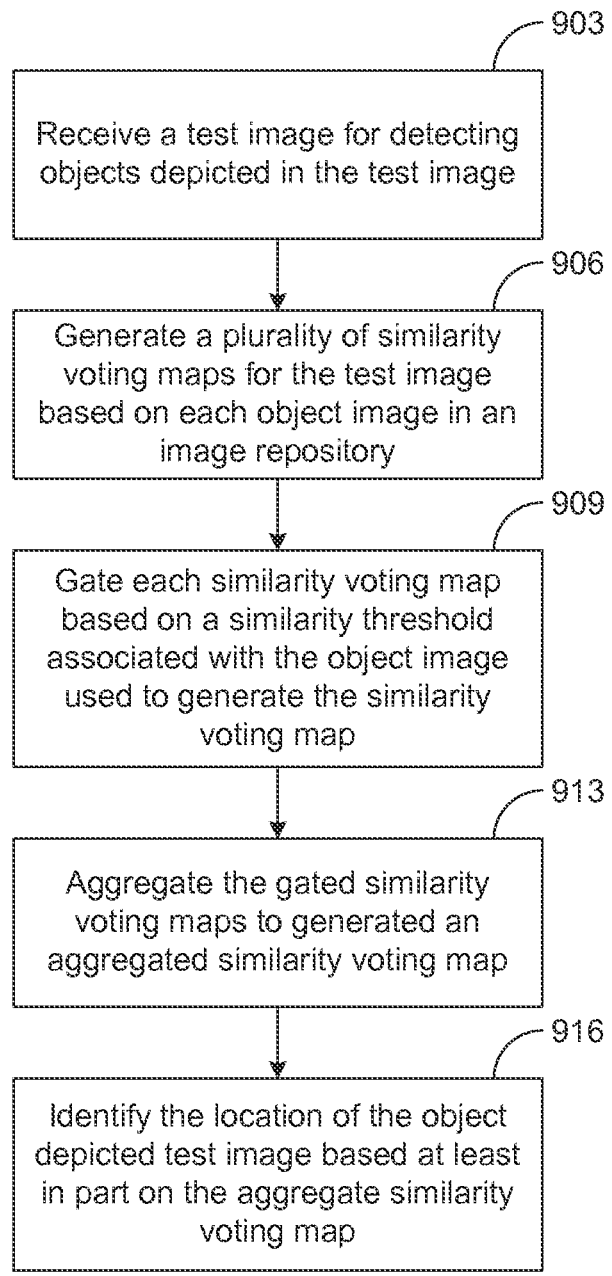
FIG. 9 is a flow chart illustrating another exemplary method of a detection service for detecting an object depicted in a test image.

FIG. 9 is a flowchart that provides one example of the operation of a portion of the detection service 143 (FIG. 2) according to certain embodiments. It is understood that the flowchart of FIG. 9 provides merely an example of the many different types of functional arrangements that may be employed to implement the operation of the portion of the detection service 143 as described herein. As an alternative, the flowchart of FIG. 9 may be viewed as depicting an example of steps of a method implemented in the computing device 103 (FIG. 2) according to one or more embodiments.

Beginning at step 903, the detection service 143 receives a test image 153 (FIG. 2) for detecting objects depicted in the test image 153. In one embodiment, a user on a client device 106 (FIG. 2) may manipulate a user interface 149 via one or more I/O devices 116 (FIG. 2) to transmit a request to the detection service 143 to detect the object in the test image 153. For example, the test image may be a photograph and the object may be a face of an individual.

In step 906, the detection service 143 invokes the similarity voting service 139 to generate a plurality of similarity voting maps for the test image 153 based on each one of the object images 159 (FIG. 2) in an object repository 156 (FIG. 2). In one embodiment, the similarity voting service 139 generates the similarity voting map by identifying matching features between a sub-rectangle of the object image 159 and portions of the test image 153. The similarity voting service 139 then determines the similarity between the matching features in the two images and generates the similarity voting map.

Next, in step 909, the detection service 143 implements gating on each similarity voting map based on a similarity threshold associated with the respective object image 159 used to generate each similarity voting map. In one embodiment, the detection service 143 identifies the similarity threshold for each object image 159 and subtracts the similarity threshold from the similarity scores represented in the similarity voting map generated from that object image 159. Any negative values resulting from the subtraction are zeroed and thus disregarded. These values provide no information as to the location of the object depicted in the test image 153. The remaining values (all positive values) represent a similarity that exceeds the minimum necessary to be similar to object in the object image 159, i.e., a face.

Next, in step 913, the detection service 143 aggregates the similarity voting maps after they have been modified via gating to generate an aggregated similarity voting map. In one embodiment, the aggregated similarity voting includes aggregated similarity scores of all of the gated similarity voting maps. Upon generating the aggregate similarity voting map, in step 916 the detection service 143 identifies the location of the object depicted in the test image 153 based at least in part on the aggregate similarity voting map. For example, the highest similarity as shown in the similarity voting map may represent the center of the object depicted in the test image 153. In one embodiment, local maximum nodes of the aggregate similarity voting map may be identified and their corresponding non-maxima may be suppressed to reduce the likelihood of falsely identifying the location.

Figure 10:
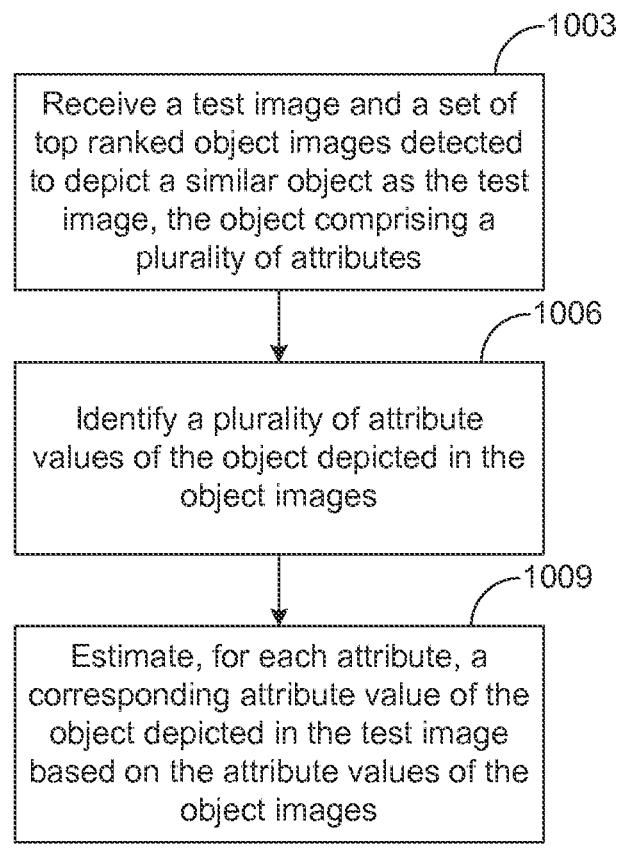
FIG. 10 is a flow chart illustrating an exemplary method of an attribute service for estimating an attribute value of an attribute of the test image.

FIG. 10 is a flowchart that provides one example of the operation of a portion of the attribute service 147 (FIG. 2) according to certain embodiments. It is understood that the flowchart of FIG. 10 provides merely an example of the many different types of functional arrangements that may be employed to implement the operation of the portion of the attribute service 147 as described herein. As an alternative, the flowchart of FIG. 10 may be viewed as depicting an example of steps of a method implemented in the computing device 103 (FIG. 2) according to one or more embodiments.

At step 1003, the attribute service 147 receives a test image 153 (FIG. 1) and a set of top ranked object images 159 (FIG. 2) detected to depict a similar object as the test image 153. In one embodiment, the detection service 143 (FIG. 2) identifies the object images 159 that depict a similar object as the test image 153 as discussed above. In another embodiment, another similarity approach may be implemented to identify the object images 159 in the set of top ranked object images 159. For example, the generalized Hough voting approaching may be used, as known in the art. Additionally, each object includes one or more attributes. For example, the object may be a face with attributes such as an age, a gender, an eye color, a hair color, a pose and/or any other attribute associated with a face.

Next in step 1006, the attribute service 1006 identifies a plurality of attribute values of the object depicted in each object image 159. In one embodiment, the attribute values may be stored in a metadata associated with the respective object images 159. Additionally, the attribute values may have been defined manually via ground-truthing where the attribute values are manually indicated and then stored in the metadata.

In step 1009, the attribute service 147 estimates an attribute value for each attribute in the test image 153 that corresponds with the attributes in the object images 159. In one embodiment, the attribute service 147 averages the attribute values stored in the metadata of the object images 159 for a respective attribute to estimate the corresponding attribute value for the test image 153. For instance, the attribute service 147 averages the ages stored in the metadata of the object images 159 to estimate the age attribute of the individual depicted in the test image 153. In another embodiment, the attribute service computes a mode of the attribute values stored in the metadata of the object images 159 for a respective attribute to estimate the corresponding attribute value for the test image 153. For instance, the attribute service 147 computes a mode of the eye color stored in the metadata of the object images 159 to estimate the eye color attribute of the individual depicted in the test image 153. In another embodiment, the attribute service 147 determines a likely attribute value of the attribute based on the posterior distribution of the attribute values and the distribution of the attribute. For example, the attribute service 147 may compute a histogram of the attribute values to determine the posterior distribution of the attribute values. The likely attribute value of the attribute may correspond to a maximum of the function of the histogram of the attribute values and the distribution of the respective attribute over the object images 159.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   receiving, at a computing device comprising a processor, a first image depicting a first object and a plurality of second images detected to depict second objects similar to the first object, the first object comprising a plurality of attributes;
   identifying a plurality of attribute values of the second objects depicted in the second images, the attribute values being stored in corresponding metadata associated with the second images; and
   for each attribute of the plurality of attributes, generating an estimate for a corresponding attribute value of the first object depicted in the first image based on the attribute values of the second objects stored in the corresponding metadata associated with the second images.

2. The computer-implemented method of claim 1, wherein generating the estimate for the corresponding attribute value comprises:
   averaging the attribute values of the second objects stored in the corresponding metadata associated with the second images.

3. The computer-implemented method of claim 1, wherein generating the estimate for the corresponding attribute values comprises:
   computing a statistical mode of the attribute values of the second objects stored in the metadata associated with the second images.

4. The computer-implemented method of claim 1, wherein generating the estimate for the corresponding attribute value comprises:
   computing a distribution of the attribute over the set of second images;
   computing a posterior distribution of the attribute across the second images; and
   computing a maximum likelihood of the attribute value based at least in part on the distribution and the posterior distribution of the attribute.

5. The computer-implemented method of claim 4, wherein computing the posterior distribution of the attribute comprises computing a histogram of the attribute values for the respective attribute over the second images.

6. The computer-implemented method of claim 1, wherein the second images are detected to depict the second objects similar to the first object based on identifying feature matches between each respective second image and the first image, wherein there is a spatial relationship between each respective second image feature and a first image feature.

7. The computer-implemented method of claim 1, wherein the first object comprises a face.

8. The computer-implemented method of claim 1, wherein the attributes comprise an eye color, a hair color, an age, a gender, an expression, and a pose.

9. The computer-implemented method of claim 1, wherein the second images are a set of top ranked images that are detected to depict the second objects similar to the first object, the top ranked images identified based on a respective similarity score between each of the respective second images and the first image.

10. A system comprising:
    a processor for executing instructions stored in computer-readable medium on one or more devices,
    the instructions comprising one or more modules configured to perform the steps comprising:
       receiving a first image having a first face and a plurality of second images, each one of the second images depicting a second face detected to be similar to the first face, each of the first and second faces comprising a plurality of attributes;
       identifying a plurality of second attribute values of attributes of the second faces, the second attribute values being stored in a metadata associated with each respective second image; and
       for each attribute of the first face in the first image, generating an estimate for a first attribute value by computing a likely attribute value based on the second attribute values stored in the metadata associated with each of the second images.

11. The system of claim 10, wherein computing the likely attribute value comprises:
    computing a distribution of the attribute over the set of second images;
    computing a posterior distribution of the attribute across the second images; and
    computing a maximum likelihood of the first attribute value based at least in part on the distribution and the posterior distribution of the attribute.

12. The system of claim 11, wherein computing the posterior distribution of the attribute comprises computing a histogram of the second attribute values for the respective attribute over the second images.

13. The system of claim 11, wherein the second images are detected to depict the object similar to the first image based on identifying feature matches between each respective second image and the first image, wherein there is a spatial relationship between each respective second image feature and a first image feature.

14. The system of claim 10, wherein the attributes comprise an eye color, a hair color, an age, a gender, and an expression.

15. A method comprising:
    identifying, by a process of a computing device, feature matches between each of a plurality of second images and a first image, each of the feature matches between a second feature depicted in a respective second image and a first feature depicted in the first image, wherein there is a spatial relationship between each respective second feature and the first feature, and wherein the first feature depicted in the first image comprises a plurality of attributes; and
    for each attribute of the first feature depicted in the first image, generating, by the processor, an estimate for an attribute value based at least in part on information stored in metadata associated with matched second features depicted in the second images.

16. The method of claim 15, wherein generating the estimate for the attribute value comprises averaging a plurality of attribute values stored in the metadata associated with the second matched features.

17. The method of claim 15, wherein generating the estimate for the attribute value comprises computing a statistical mode of a plurality of attribute values stored in the metadata associated with the second matched features.

18. The method of claim 15, wherein generating the estimate for the attribute value comprises:
- computing a distribution of the attribute over the second images;
- computing a posterior distribution of the attribute across the second images; and
- computing a maximum likelihood of the attribute value based at least in part on the distribution and the posterior distribution of the attribute.

19. The method of claim 18, wherein computing the posterior distribution of the attribute comprises computing a histogram of the attribute values for the respective attribute over the second images.

20. The computer-implemented method of claim 1, wherein the second images are associated with similarity scores based on a comparison of content of the first image and content of the second images, and wherein generating the estimate for the corresponding attribute value is based on the attribute values of the second objects and the similarity scores.

* * * * *